United States Patent
Berube et al.

(10) Patent No.: US 7,158,099 B1
(45) Date of Patent: Jan. 2, 2007

(54) SYSTEMS AND METHODS FOR FORMING A REDUCED-GLARE IMAGE

(75) Inventors: Denis K. Berube, Concord, MA (US); Francis J. Cusack, Jr., Groton, MA (US); Dennis C. Ehn, Newton Centre, MA (US)

(73) Assignee: Viisage Technology, Inc., Billerica, MA (US)

( * ) Notice: Subject to any disclaimer, the term of this patent is extended or adjusted under 35 U.S.C. 154(b) by 353 days.

(21) Appl. No.: 10/377,405

(22) Filed: Feb. 27, 2003

(51) Int. Cl.
*G09G 5/00* (2006.01)

(52) U.S. Cl. .......................................... 345/9; 382/115

(58) Field of Classification Search .................. 345/9, 345/8, 32, 419; 369/112.09; 362/555; 349/62; 382/115, 116, 118, 132, 131, 154; 348/68, 348/70; 347/253; 356/603
See application file for complete search history.

(56) References Cited

U.S. PATENT DOCUMENTS 6,277,067 B1 * 8/2001 Blair .......................... 600/167
6,332,693 B1 * 12/2001 Dove et al. .................. 362/251
6,843,566 B1 * 1/2005 Mihara ......................... 353/29
6,862,054 B1 * 3/2005 Kawakami .................... 349/65

FOREIGN PATENT DOCUMENTS

JP  2001-273498  * 10/2001

* cited by examiner

*Primary Examiner*—Richard Hjerpe
*Assistant Examiner*—Abbas I. Abdulselam
(74) *Attorney, Agent, or Firm*—Lahive & Cockfield, LLP

(57) ABSTRACT

A method and system are disclosed for producing a reduced-glare image. The method and system use at least two light sources located a selected distance apart from each other. An image acquisition device acquires a first image of an object using illumination from the first light source, but not the second. Then the image acquisition device acquires a second image of the object using illumination from the second light source, but not the first. The two images, having glare at different pixel locations, are then used to form a reduced-glare image.

21 Claims, 6 Drawing Sheets

SYSTEMS AND METHODS FOR FORMING A REDUCED-GLARE IMAGE

TECHNICAL FIELD

The present invention relates generally to imaging of an object, and more specifically, relates to systems and methods for reducing the effects of glare in an image of the object.

BACKGROUND

With the present security concerns in the world, there is a heightened need for systems and methods that can recognize or identify individuals in various settings. For example, security needs often dictate that an individual be correctly identified before the individual is permitted to perform some task, such as using an automated teller machine (ATM) or entering an airplane, a federal or state facility, an airport location, or other restricted area.

Traditional methods of identifying individuals, such as looking up a suspect in a book of mug shots, are slow, tedious, and prone to human error. For example, during the "look-up" phase, when a security officer attempts to match the face of a suspect to a depository of photographs of wanted criminals, there is the risk that a photograph of a wanted individual is overlooked in error. Additionally, in a setting where a large number of people are present, there is always the risk that a wanted criminal might get lost in the crowd, thus avoiding detection by security personnel.

Other traditional means of identification include signature or fingerprint identification, or presentation of an identification document, such as a passport or license. While useful in many circumstances, such methods, however, suffer from being intrusive because they require individuals to perform some act like signing or staining their thumb, or showing a document. Aside from the inconvenience of having to perform these acts, another drawback of such identification methods is that it gives the individual an opportunity to thwart the method by, for example, forging a signature or a passport.

To overcome some of the aforementioned limitations, systems and methods have been developed that can automatically recognize an individual. By employing such an automated system, security personnel are freed from having to perform this task using traditional slow and tedious methods. Automated methods, which rely on computers for recognition of individuals, can be both fast and accurate, and are therefore in high demand.

One automated method for recognizing an individual involves matching a facial image of the individual to a reference image from a database. For example, by using a camera to obtain the facial image of the individual, and then comparing selected pixel intensities of the facial image to those of reference images from the database, it is possible to determine if the facial image matches one from the database. If the matched reference individual can be associated with a name or some other identifier, then identification is possible.

Despite the advantages of the automated method, various factors can effect the quality of the facial image of the individual. For example, a common problem, especially for individuals who wear glasses, is the effect of glare from the glasses during imaging of the individual. If the resulting facial image is poor due to glare, subsequent identify of the individual from the facial image becomes significantly burdensome. Therefore, methods that can improve the accuracy of recognition systems, by improving the quality of the images acquired, would be most welcome.

BRIEF SUMMARY OF THE INVENTION

The present invention addresses the above described limitations of identifying an object from an image of the object. The present invention describes a method and a system that reduce the effects of glare on an object when forming an image of the object.

The systems and methods described herein need not be used for an image recognition system. Instead, they may be used wherever it is desirable to produce images with reduced glare, for example, drivers licenses, passports and other forms of identification that include an image of an individual.

In one aspect of the present invention, a system is provided for forming a reduced glare image of an object. The system includes a first light source for illuminating the object from a first position and a second light source for illuminating the object from a second position. The light sources are located in positions so that an energy beam emitted from the first light source intersects an energy beam illuminated from the second light source intersect at a desired angle. An image acquisition device is included with the system. The image acquisition device acquires a first image of the object when the object is illuminated with only the first light source. The image acquisition device acquires a second image of the object when the object is illuminated with only the second light source. A controller included in the system forms the image of the object having reduced glare using the first image of the object and the second image of the object. The controller further controls when the first light source emits its energy beam, when the second light source emits its energy beam, and when the image acquisition device acquires the first and second images. Optionally, the controller includes an image producer module for forming the image of the object having reduced glare.

In another aspect of the present invention, a method for forming an image of an object that has reduced glare is provided. The method includes the steps of acquiring a first image of an object while illuminated with a first light source and acquiring a second image of the object while illuminated with a second light source. The method compares intensity values for selected pixels from each of the images and identifies the pixels from the comparison with a lower intensity value. Using the identified pixels with the lower intensity value a composite image is formed of the object having reduced glare.

In yet another aspect of the present invention, a device readable medium holding device readable instructions for performing a method in a system for forming a reduced glare image of an object is provided. Following the instructions held by the device readable medium, the system obtains a first image of an object while the object is illuminated with a first light source and obtains a second image of the object while the object is illuminated with a second light source. By comparing intensity values for selected pixels from each of the images obtained, the system identifies which of the pixels from the two images that have a lower intensity value. Using the pixels that have the lower intensity value, the system forms a composite image of the object. The composite image that is formed is the reduced glare image of the object.

DETAILED DESCRIPTION

Figure 1:
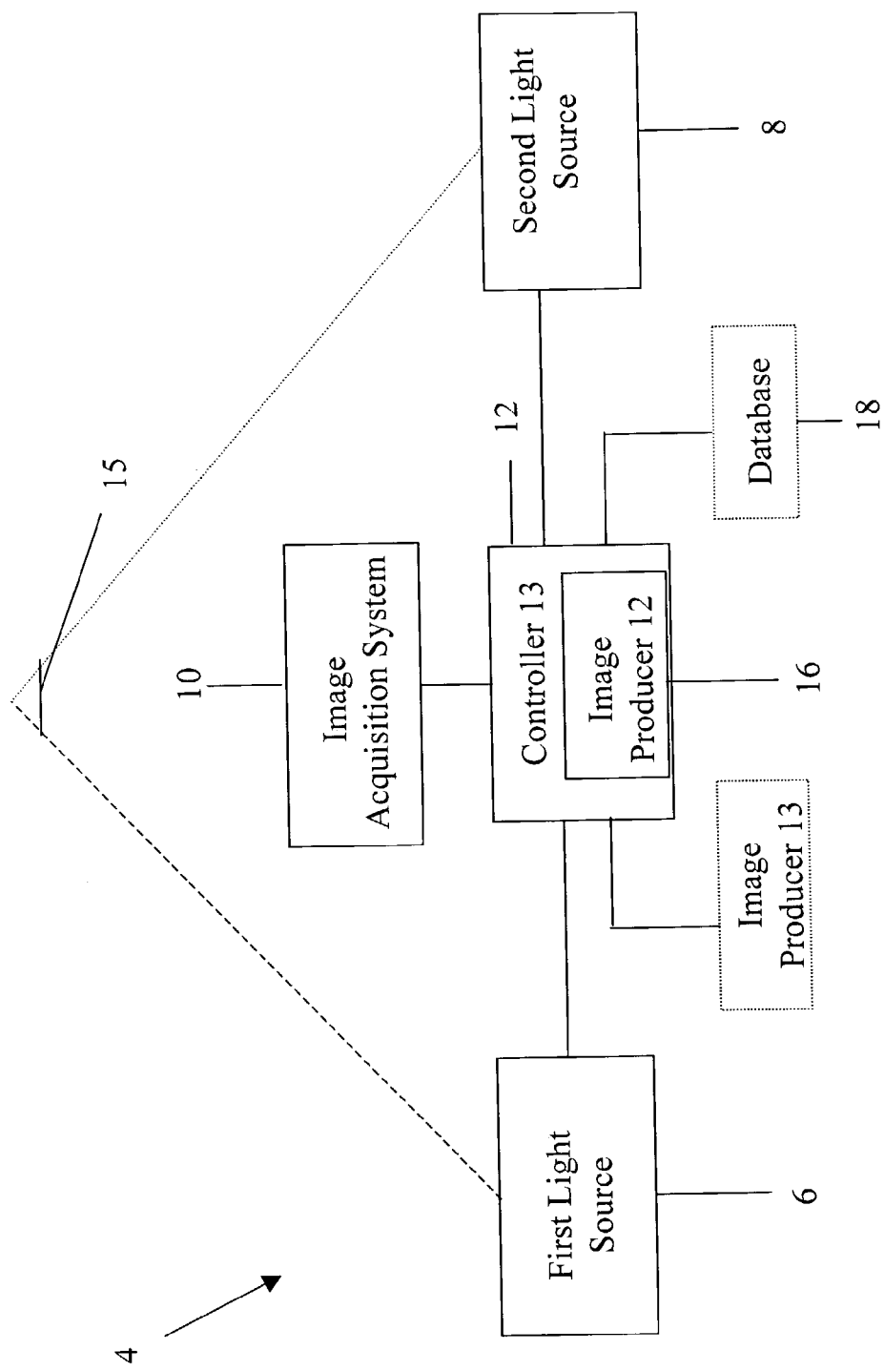
FIG. 1 is a schematic block diagram of a system for producing a reduced-glare image, according to the teachings of the present invention.

FIGS. 1–5, wherein like parts are designated by like reference numerals throughout, illustrate exemplary embodiments of a system and method suitable for recognizing an individual. Although the present invention is described with reference to the exemplary embodiments illustrated in the Figures, it should be understood that many alternative forms could embody the present invention. One of ordinary skill in the art will additionally appreciate different ways to alter the parameters of the embodiments disclosed, such as the size, language, interface, or type of elements or materials utilized, in a manner still in keeping with the spirit and scope of the present invention.

Referring to FIG. 1, an imaging system 4 for producing a reduced glare image suitable for use in identifying an object from the image is shown. The imaging system 4 includes a first light source 6, a second light source 8, an image acquisition device 10, and a controller 12. The imaging system 4 optionally includes a database 18 for holding images of other objects. Those skilled in the art will recognize that the database 18 can be located at a location remote from the imaging system 4. If the database 18 is located at a remote location, the imaging system 4 is capable of accessing the database 18 via a LAN, WAN, dedicated communication channel, or other communication medium such as a wireless medium or network.

The controller 12 controls the actuation or triggering of the light sources 6, 8 and the actuation or triggering of the image acquisition device 10. The controller 12 optionally includes an image producer 13 for forming the reduced glare image of the object. Optionally, the image producer 13 is included in the imaging system 4 as a module that operates in conjunction with the controller 12, but not as a module within the controller 12.

The first and second light sources 6 and 8 help illuminate an object to be imaged. The image acquisition device 10 acquires a first image of the object illuminated with the first light source 6 and a second image of the object illuminated with the second light source 8. The controller 12 actuates or triggers the image acquisition device 10, the first light source 6 and the second light source 8 such that when the first image is acquired, the second light source 8 is not substantially illuminating the object. Likewise, the controller 12 ensures that when the second image is acquired, the first light source 6 is not substantially illuminating the object. The image producer 13 uses the first image and the second image to form a reduced-glare image of the object, as explained in more detail below.

The first light source 6 and the second light source 8 are separated by an angle 15 so that a glare caused by the first light source in the first image is located at a different location than a glare caused by the second light source in the second image. The light sources 6, 8 used in the imaging system can be an AC operated light source with electronically driven luminance changeover, such as an illumination source operating with a color temperature at about 2856° K. Alternatively, fluorescent lighting can be used such as, a commercially available fluorescent light box.

The image acquisition device 10 can include a CCD camera, or a video camera, or both, as well as other suitable acquisition devices known to those of ordinary skill in the art. Other suitable acquisition devices include, but are not limited to, high resolution solid-state (CCD) monochrome cameras. One such CCD camera suitable for use in the imaging system 8 is the Sony® XC-77, available from Sony Electronics Inc. of 1 Sony Drive, Park Ridge, N.J. 07656. Other appropriate CCD cameras include the Sierra Scientific® MS-4030, the COHU Model 4815-5000, and the Dage® CCD-72.

Figure 2:
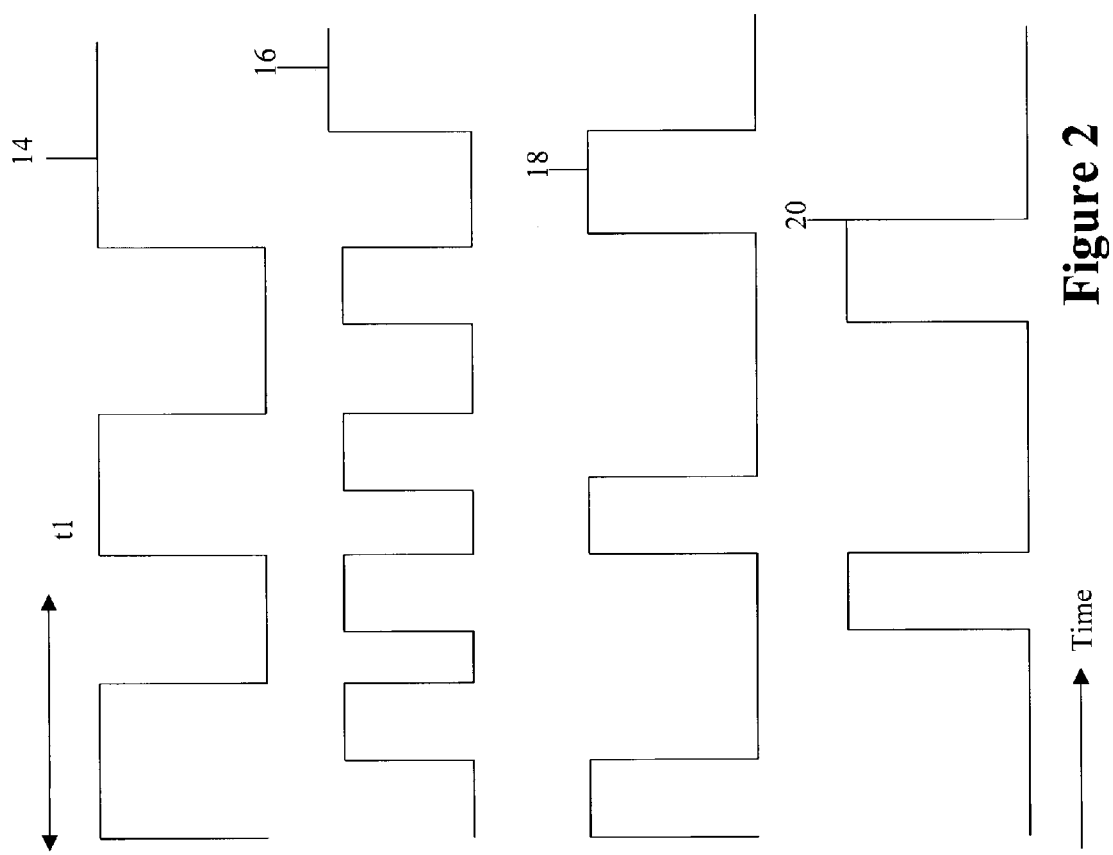
FIG. 2 illustrates an exemplary timing diagram suitable for practicing an illustrative embodiment of the present invention.

Referring to FIG. 2, a timing diagram graphically illustrates the actuation of the light sources 6 and 8, and the image acquisition device 10, by the controller 12. The light sources 6 and 8, are alternately actuated and synchronized with the image acquisition device 10. Trace 14 represents an actuation signal produced by the controller 12 to turn the first light source 6 on and off at desired intervals. Trace 14 has a period $\tau_1$. Trace 16 represents an actuation signal produced by the controller 12 to turn the second light source 8 on and off at desired intervals. Trace 16 has a period $\tau_2$. Traces 14 and 16 are illustrated as representing actuation signals having two levels, nonetheless those skilled in the art will recognize that the actuation signals to actuate or trigger the light sources 6 and 8 can have more than two levels to indicate to each of the light sources a desired illumination intensity. In this manner, illumination intensity produced by one or both of the light sources 6, 8 are variable and controllable by the controller 12.

Trace 18 represents an actuation signal produced by the controller 12 to actuate the image acquisition device 10 to acquire an image of a subject when the first light source 6 is in an on state. Trace 20 represents an actuation signal produced by the controller 12 to actuate the image acquisition device 10 to acquire another image of the subject with the second light source 8 is in an on state.

Figure 3:
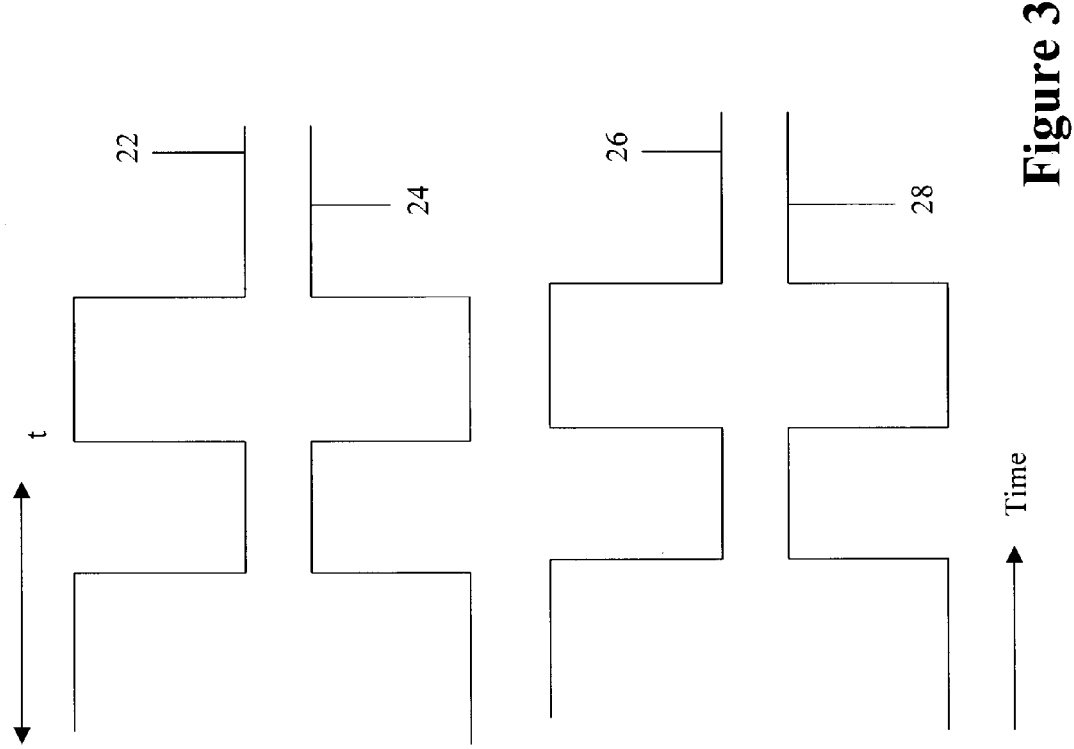
FIG. 3 illustrates another exemplary timing diagram suitable for practicing an illustrative embodiment of the present invention.

In FIG. 3, illustrates another exemplary timing diagram of signals produced by the controller 12. Trace 22 represents an actuation signal produced by the controller 12 to turn the first light source 6 on and off at desired intervals. Trace 22 has a period $\tau$. Trace 24 represents an actuation signal produced by the controller 12 to turn the second light source 8 on and off at desired intervals. Trace 24 has a period $\tau$.

Trace 26 represents an actuation signal produced by the controller 12 to actuate the image acquisition device 10 to acquire an image of a subject when the first light source 6 is in an on state. Trace 28 represents an actuation signal produced by the controller 12 to actuate the image acquisition device 10 to acquire another image of the subject with the second light source 8 is in an on state.

To form the reduced glare image of the object, the image acquisition device 10 acquires a first image of an object illuminated with the first light source 6 and a second image of the object illuminated with the second light source 8. That is, when the first image is acquired, the second light source is not illuminating the object, and when the second image is acquired, the first light source is not illuminating the object. The time difference between the acquisition of the images should be sufficiently small to ensure the object does not move appreciably during imaging.

Figure 4:
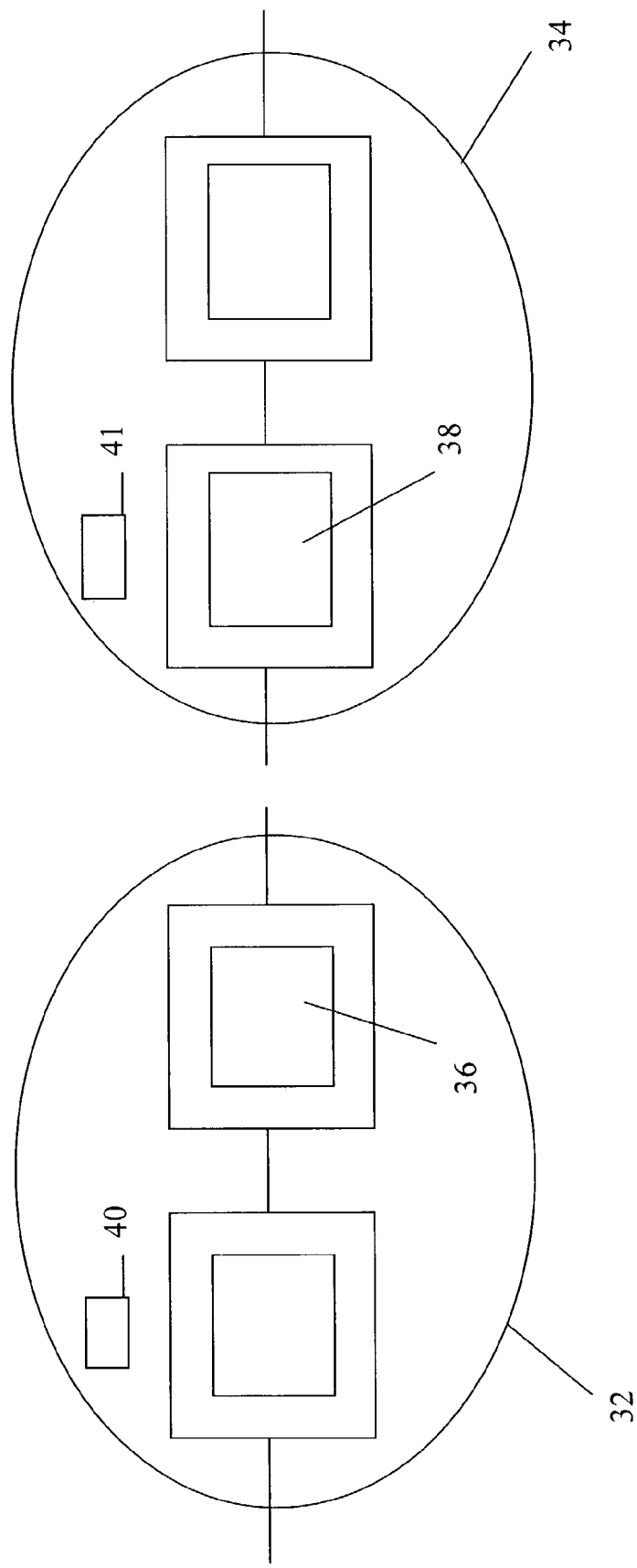
FIG. 4 illustrates two exemplary images suitable for producing a reduced-glare image, according to one embodiment of the present invention.
Figure 5:
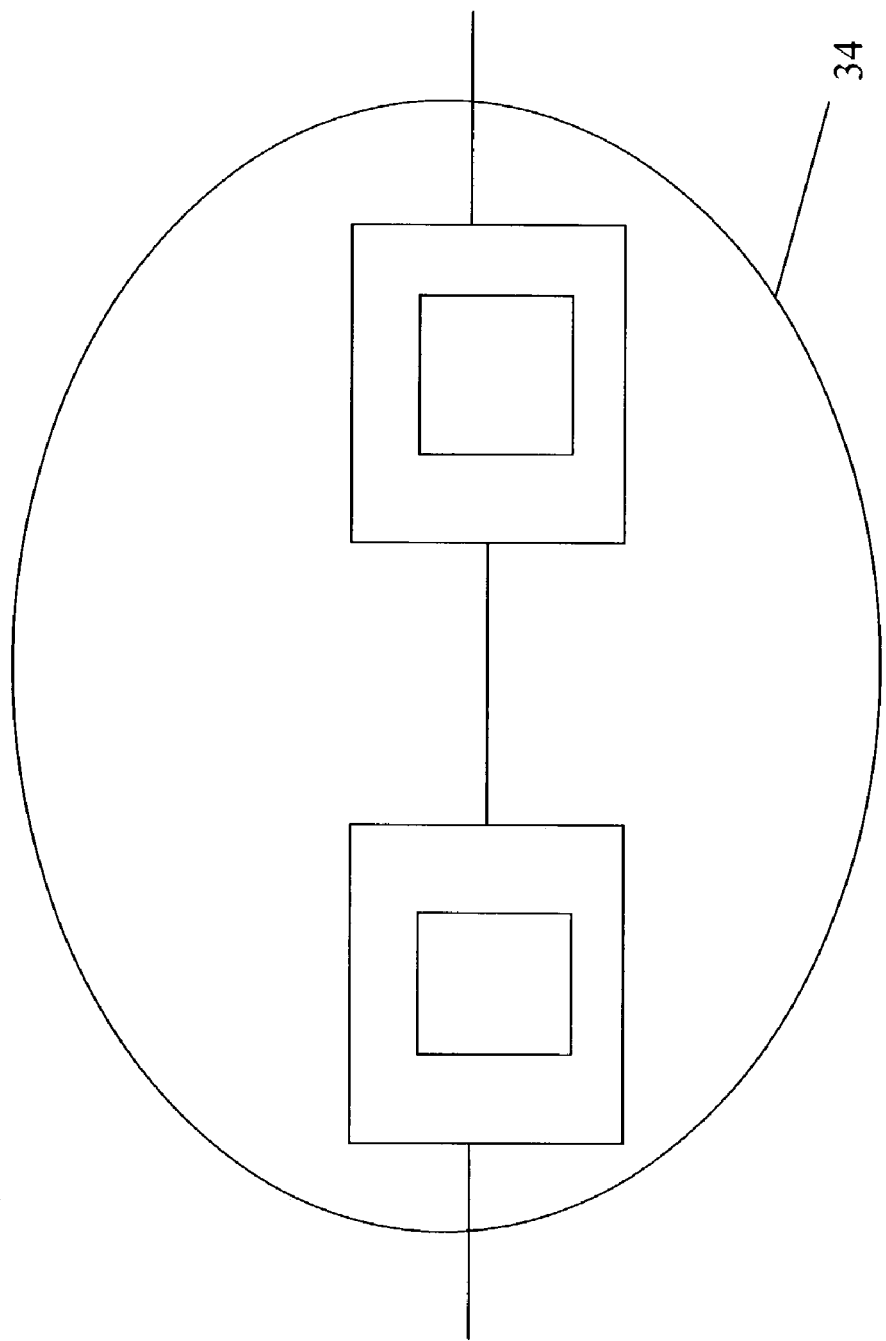
FIG. 5 illustrates an exemplary reduced glare image of an object formed from two exemplary images illustrated in FIG. 4.

Referring to FIGS. 4 and 5, a first image 32 and a second image 32 of a face acquired by the image acquisition device 10 is illustrated. The first image 32 was acquired by the image acquisition device 10 while the first light source 6 was in its on state and the second light source 8 was in its off state. The second image 34 of the face was acquired by the image acquisition device 10 while the second light source 8 was in its on state and the first light source 6 was in its off state. In other words, the first image 32 was acquired using illumination from the first light source 6, but not the second light source 8, and the second image 34 was acquired using illumination from the second light source 8, but not the first light source 6.

The first image 32 has a first glare spot 36 resulting from light from the first light source 6 reflecting off a portion, of eyeglasses worn by the individual. Similarly, the second image 34 has a second glare spot 38 resulting from light from the second light source 8 reflecting off another portion of the same eyeglasses worn by the individual. The images 32 and 34 represent images acquired were the individual's head did not substantially move, nor did the individual's pose or facial expression substantially change between the acquiring of the first image 32 and the acquiring of the second image 34.

The image producer 13 uses the first image 32 and the second image 34 to form a reduced-glare image 42 in the following manner. The image producer 13 compares a luminous energy value of a first pixel 40 from a first location in the first image 32 and a luminous energy value of a second pixel 41 from a corresponding location in the second image 34. From the comparison, the image producer 13 selects the pixel that has the lowest luminous energy value and uses that pixel to form the reduced-glare image 42. For example, when the image producer 13 reaches a pixel location in the first image 32 corresponding to the first glare spot 36, the image producer 13 chooses the corresponding pixel from the second image 34 for use in the reduced glare image 42. The image producer 13 selects the corresponding pixel from the second image 34 since this pixel exhibits a lower luminous energy value than the pixel in the first image 36. The image producer 13 repeats the comparison of luminous energy values between pixels at corresponding locations in the first image 32 and the second image 34 and forms the reduced glare image using the pixels determined to exhibit the smaller luminous energy value. The reduced glare image 42 of the object is a composite of the first image 32 and the second image 34.

Figure 6:
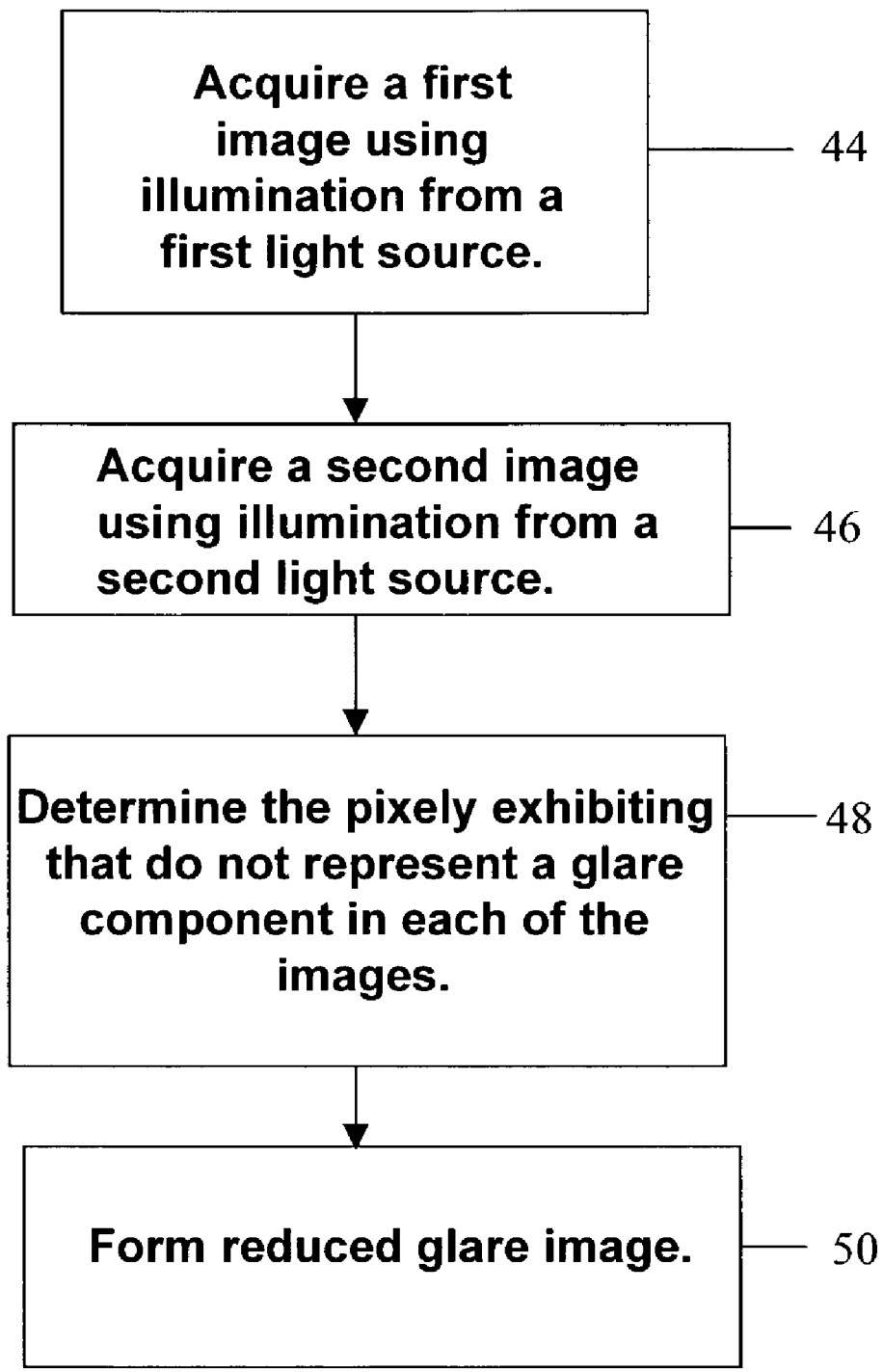
FIG. 6 is a flowchart illustrating steps for producing a reduced-glare image according to the teachings of the present invention.

Referring to FIG. 6, a flowchart for producing a reduced glare image of an object that is suitable for use in identifying the object is shown. In step 44, the image acquisition device 10 acquires a first image of the object illuminated with the first light source 6. In step 46, the image acquisition device 10 acquires a second image of the object illuminated with the second light source 8. The first light source 6 and the second light source 8 are separated by an angle. The angle is such so a glare caused by the first light source 6 in the first image is located at a first location in the first image and a glare caused by the second light source 8 in the second image is located in a second location. In step 48, the image producer 13 performs a pixel comparison by comparing pixels from corresponding locations in the first image 32 and in the second image 34. The comparison determines which of the corresponding pixels exhibit the lowest luminous value, and hence, the pixels that do not represent a glare component in the two images. In step 50, the image producer 13 forms a composite or reduced glare image of the object using the pixels determined to exhibit the lower luminous intensity value.

When a reduced-glare image of the individual to be identified is obtained, identification can proceed using several methods. For example, PCA, mentioned above, can be brought to bear to identify the individual. Other methods known to those of ordinary skill in the art suitable for identifying individuals using images may also be used.

Those skilled in the art will recognize, or be able to ascertain using no more than routine experimentation, many equivalents to the specific embodiments and methods described herein. Such equivalents are intended to be encompassed by the scope of the following claims. In addition, while various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims. For example, although emphasis has been placed on producing the reduced-glare images of the present invention for recognition systems, these images can be produced whenever a reduced-glare image is desirable, not just for image recognition. In addition, more than two light sources can be used if this is advantageous for producing a reduced-glare image.

What is claimed is:

1. A biometric identification system for forming a reduced glare image of a person or a portion of the person suitable for identification of the person, the biometric identification system comprising a first light source for illuminating at least a portion of a person from a first position and a second light source for illuminating the portion of the person from a second position, the light sources are located in their respective positions so that energy beams emitted from the first light source and the second light source intersect at a desired angle;

an image acquisition device for acquiring a first image of the portion of the person illuminated with only the first light source and a second image of the portion of the person illuminated with only the second light source; and a controller for forming the reduced glare image of the portion of the person from the first image of the portion of the person and the second image of the portion of the person and for controlling when the first light source emits its energy beam, when the second light source emits its energy beam, and when the image acquisition device acquires the first and second images, wherein the biometric identification system derives biometric data from the reduced glare image for identification of the person.

2. The biometric identification system of claim 1, wherein the desired angle is selected so that a coordinate location of a first glare component in the first image of the portion of the person resulting from illumination of the portion of the person by the first light source differs from a coordinate location of a second glare component in the second image resulting from illumination of the portion of the person by the second light source.

3. The biometric identification system of claim 1, wherein the image acquisition device is selected from one of a CCD camera and a video camera.

4. The biometric identification system of claim 1, wherein the first light source is actuated $N_1$ times with a period between actuations given by $\tau_1$, and the second light source is actuated $N_2$ times with a period between actuations given by $\tau_2$, where $N_1$ and $N_2$ are integers greater than or equal to unity.

5. The biometric identification system of claim 4, wherein a duty cycle of the first light source and the second light source allows for the acquisition of the second image of the portion of the person before an expression of the person acquired in the first image substantially changes.

6. The biometric identification system of claim 4, wherein a duty cycle of the first light source and the second light source allows for the acquisition of the second image of the portion of the person before a pose of the portion of the person acquired in the first image substantially changes.

7. The biometric identification system of claim 5, wherein $\tau_1$ is substantially equal to about $\tau_2$, and a frame rate of the image acquisition device is substantially equal to about $2/\tau_1$.

8. The biometric identification system of claim 1, further comprising an image producer for forming the image with reduced-glare, the image producer compares a first pixel from the first image and a second pixel from the second image and selects for use in forming the reduced-glare image the pixel having a least amount of luminous intensity, the first and second pixels have corresponding locations in their respective images.

9. The biometric identification system of claim 1, further comprising a recognition module for utilizing the derived biometric data from the reduced glare image to find a representation of the person held in a database of reference representations of images.

10. A method for forming an image of a person or a portion of the person that has reduced glare suitable for biometric identification of the person, the method comprising the steps of
    acquiring a first image of a portion of a person while illuminated with a first light source;
    acquiring a second image of the portion of the person while illuminated with a second light source;
    forming a composite image of the portion of the person from the first image of the portion of the person and the second image of the portion of the person by comparing intensity values for corresponding pixels from each of the images and using the pixels identified from the comparison as having a lower intensity value, the composite image forming the image of the portion of the person that has the reduced glare; and
    deriving biometric data from the composite image to identify the person.

11. The method of claim 10, wherein the first light source and the second light source are separated by an angle so that a coordinate location of a first glare component in the first image caused by the first light source differs from a coordinate location of a second glare component in the second image caused by the second light source.

12. The method of claim 10, further comprising the steps of,
    triggering the first light source to illuminate the portion of the person only when acquiring the first image of the portion of the person; and
    triggering the second light source to illuminate the portion of the person only when acquiring the second image of the portion of the person.

13. The method of claim 12, wherein a time period between the triggering of the first light source and the triggering of the second light source is selected to have a value to allow for the acquiring of the second image of the portion of the person before a pose of the person acquired in the first image of the portion of the person substantially changes.

14. The method of claim 12, wherein a time period between the triggering of the first light source and the triggering of the second light source is selected to have a value to allow for the acquiring of the second image of the portion of the person before an expression of the portion of the person captured in the first image of the portion of the person substantially changes.

15. A device readable medium holding device readable instructions for performing a method in a biometric identification system for forming a reduced glare image of a person or portion of a person suitable for use by the biometric identification system to identify the person, the method comprising the steps of
    obtaining a first image of a portion of a person while illuminated with a first light source;
    obtaining a second image of the portion of the person while illuminated with a second light source;
    comparing intensity values for selected pixels from each of the images to identify the pixels with a lower intensity value;
    forming a composite image of the portion of the person using the pixels with the lower intensity value, the composite image forming the reduced glare image of the portion of the person
    deriving biometric data from the composite image.

16. The device readable medium of claim 15, wherein the biometric identification system employs a minimum delay between the obtaining of the first image of the portion of the person and the obtaining of the second image of the portion of the person to avoid a substantial change in a pose of the person during a period between the obtaining of the first image and the obtaining of the second image.

17. The device readable medium of claim 15, wherein the first light source and the second light source are separated by an angle so that a coordinate location of a first glare component in the first image caused by the first light source differs from a coordinate location of a second glare component in the second image caused by the second light source.

18. The device readable medium of claim 15, further comprising the steps of,
    triggering the first light source to illuminate the object only when obtaining the first image of the portion of the person; and
    triggering the second light source to illuminate the portion of the person only when obtaining the second image of the portion of the person.

19. The device readable medium of claim 18, wherein a time period between the triggering of the first light source and the triggering of the second light source is selected to have a value to allow for the acquiring of the second image of the portion of the person before an expression of the person obtained in the first image of the portion of the person substantially changes.

20. The device readable medium of claim 15, further comprising the step of comparing a representation of the reduced-glare image with a representation from a database of reference representations to determine if the representation of the reduced-glare image exists in the database.

21. The device readable medium of claim 20, further comprising the steps of,
    associating an image of the portion of the person with a first vector; and
    projecting the first vector to form a second vector for use in determining if the representation of the reduced-glare image exists in the database.

* * * * *